Figure 1:
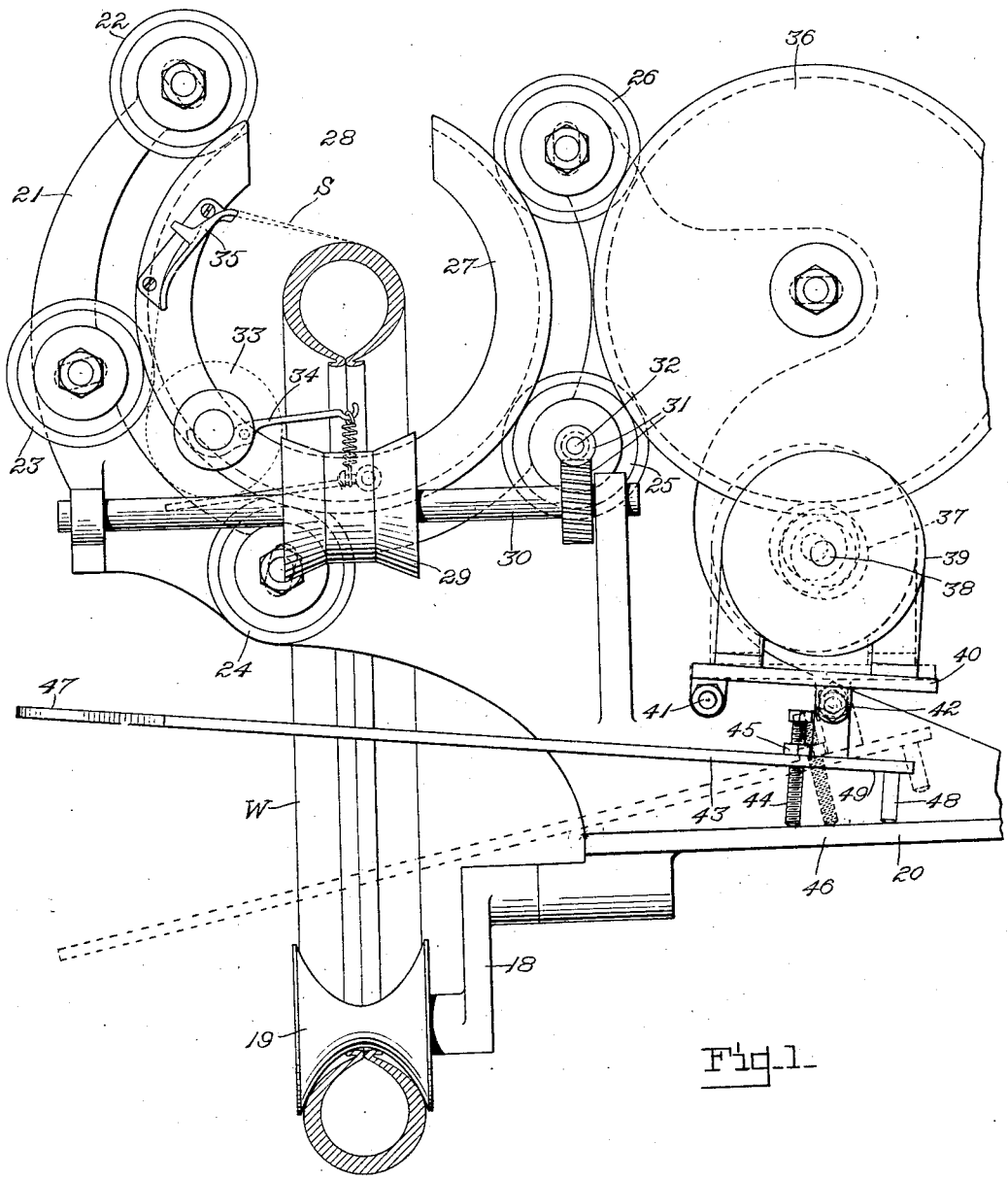

Nov. 22, 1927.

J. DERRY 1,650,197

DRIVING AND CONTROLLING MECHANISM

Filed Oct. 20, 1924

3 Sheets-Sheet 1

INVENTOR=
Jasper Derry.
by MacLeod, Calvert, Copeland & Dike.
Attys.

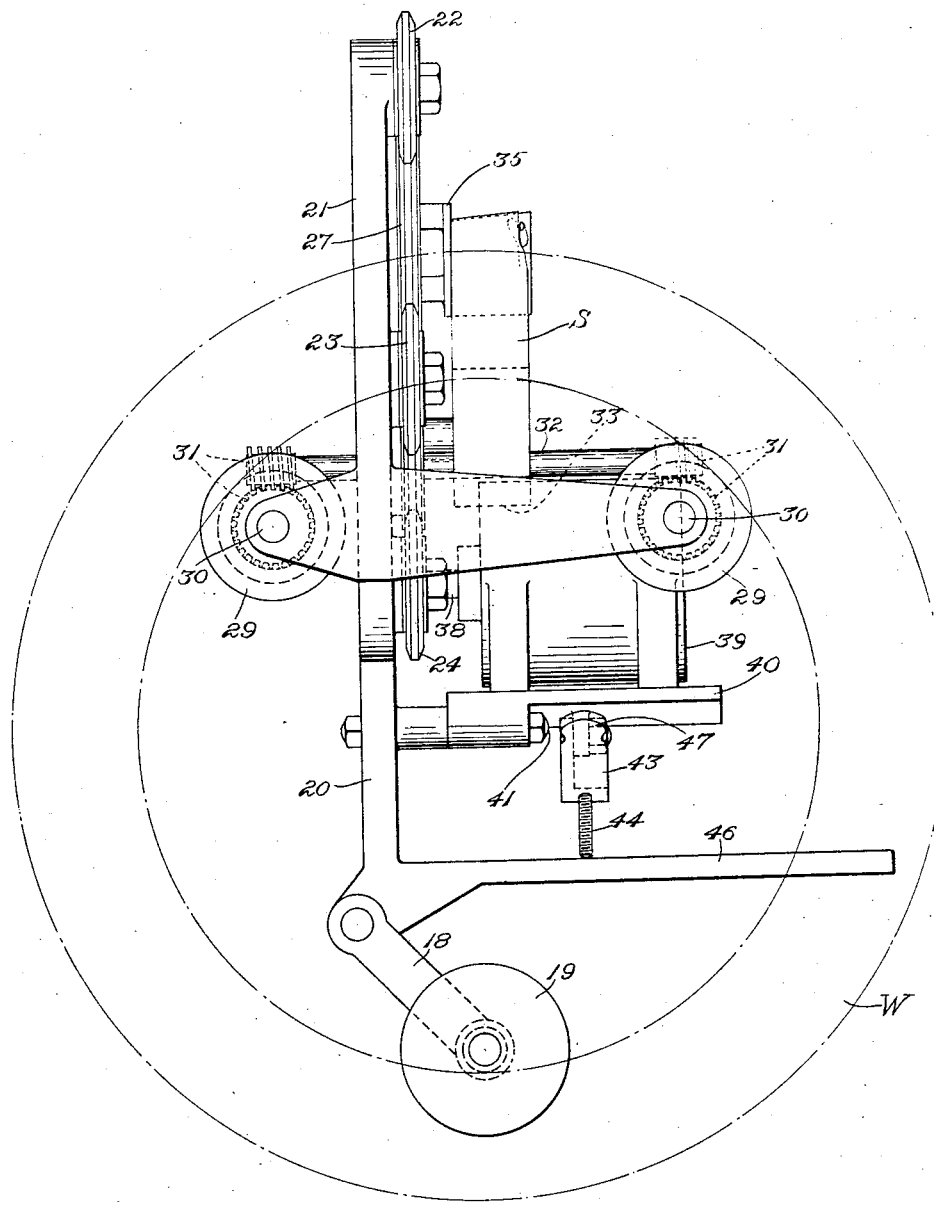
Fig-2-

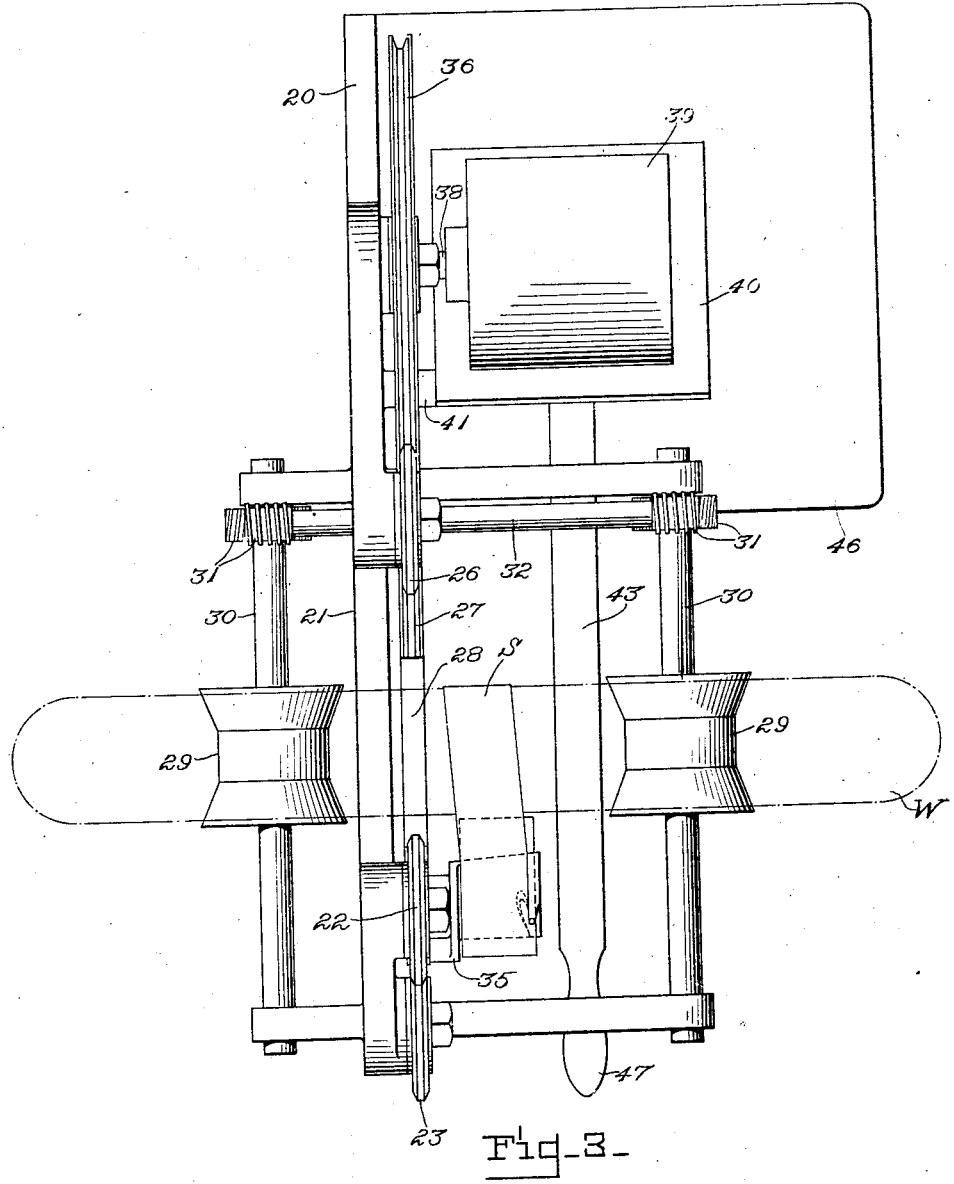

Patented Nov. 22, 1927.

1,650,197

UNITED STATES PATENT OFFICE.

JASPER DERRY, OF MEDFORD, MASSACHUSETTS, ASSIGNOR TO ANDREW TERKELSEN, OF BOSTON, MASSACHUSETTS.

DRIVING AND CONTROLLING MECHANISM.

Application filed October 20, 1924. Serial No. 744,861.

This invention relates to mechanism for controlling the connection of a machine with its source of power, and has for its object to provide simple and effective means whereby a self-contained power unit, such as an electric or other motor, may be readily moved into and out of driving engagement with the mechanism to be driven, and may be supported in such driving engagement without attention on the part of the operator, but may be readily disengaged quickly and with a minimum effort.

The more particular objects of the invention, together with means whereby the latter may be carried into effect, will best be understood from the following description of one form and application thereof illustrated in the accompanying drawings. It will be understood, however, that the particular construction and arrangement described and shown have been chosen for illustrative purposes merely, and that the invention, as defined by the claims hereunto appended, may be otherwise embodied and used without departure from the spirit and scope thereof.

In said drawings:

Fig. 1 is a side elevation, Fig. 2 a front elevation, and Fig. 3 a plan view of a wrapping machine having the invention applied thereto.

The machine herein shown is designed for the purpose of spirally wrapping automobile tire shoes with a helically wound strip of paper. As shown, the frame of the machine comprises a bracket 20 adapted to be secured in projecting position to the edge of a bench or table (not shown) and including a yoke portion 21 having an open top and a circular set of rollers 22, 23, 24, 25 and 26 for rotatably supporting an annular shuttle 27. Said shuttle is interrupted by an opening or gap 28 adapted to register with the open top of the yoke, as shown in Fig. 1, in order to permit insertion of the tire W. Said tire is supported, with its uppermost portion centered with respect to the shuttle 27, by means of a pair of work supporting rollers 29 upon which said tire is held by an idler roller 19 resting by gravity upon the lower portion of the tire and carried by an arm 18 pivoted to the bracket 20. The rollers 29 are carried by shafts 30 journalled in suitable bearings in the frame 20 and connected by worm gearing 31 with a shaft 32, also journalled in a suitable bearing in the frame and carrying the shuttle supporting roller 25. The shuttle 27 and work supporting rollers 29 are therefore connected for simultaneous rotation in synchronism, the arrangement being such that the tire W is turned relatively slowly with respect to the speed of rotation of the shuttle 27. The wrapping material, in the form of a continuous strip S of paper, is supplied from a roll 33 rotatably supported on the yoke 21 and whose rotation is resisted to apply tension to the strip by means of a friction brake 34. From the roll 33 the strip S passes to the tire W over a folding device 35 which folds under the exposed edge of the strip. The rollers 25 and 26 are engaged and rotated in unison by a friction gear or disk 36 rotatably supported on the frame 20 and to which power is applied by the mechanism to which the present invention relates and which as herein shown is as follows:

The friction disk 36, which constitutes the driven member or gear of the mechanism, is peripherally engaged and rotated by a cooperating driving member or gear in the form of a friction pinion 37 on the armature shaft 38 of an electric motor 39. The motor 39 is supported by a base or platform 40, one edge of which is pivoted at 41 to the frame 20, said base or platform being movable on its pivot 40 to raise or lower the motor 39, thereby frictionally engaging the pinion 37 with the gear 36 and disengaging the same therefrom. For so moving the base or platform 40, there is pivotally connected thereto, at a point 42 eccentric to the pivot 41, one end of a lever 43 having its opposite end extended to the front of the machine and provided with a handle 47 by which it may be manually operated. Adjacent its pivoted end the lever is provided with a movable fulcrum member in the form of an abutment screw 44 in threaded engagement with said lever and locked in adjusted position by a lock nut 45, the end of said screw engaging and being movable over a fixed abutment in the form of a shelf or ledge 46 projecting laterally from the bracket 20.

In operation, when the parts are in the disengaged position shown in full lines in Fig. 1, in order to engage the pinion 37 with the gear 36 and start the machine, the operator grasps the handle 47 and moves the lever 43 downwardly about its pivot 42. The fulcrum screw 44 is therefore caused to move rearwardly over the shelf or abutment 46 into the position shown in dotted lines, the rear end of the lever 43 being consequently forced upwardly, carrying with it the base or platform 40 and the motor 39, and moving the pinion 37 into driving engagement with the disk 36. The movement of the fulcrum screw 44 over the abutment 46 causes the point of engagement of said screw with said abutment to be brought into a position substantially vertically under the pivot 42, or into a position of dead center, so that the motor will be supported in driving position without further attention on the part of the operator, who may release the handle 47. In order to disconnect the pinion 37 from the disk 36 and stop the machine, the operator need only lift the handle 47 a sufficient amount to carry the end of the screw 44 out of vertical alignment with the pivot 42, whereupon the parts will be returned to the position shown in full lines by gravity. The downward movement of the motor may, if desired, be limited by any suitable means, as by a stud 48 carried by a rearward extension 49 on the lever 43, which stud engages the shelf or ledge 46 at the rear of the pivot 42.

It will be observed that the lever 43 and fulcrum screw 44 provide means whereby a relatively small force applied to the handle 47 results in the application of a greatly increased lifting force to the motor base 40, so that the weight of the motor may be lifted with slight effort on the part of the operator. It will also be seen that this effort may be discontinued as soon as the point of engagement of the screw 44 with the abutment 46 is brought vertically below the pivot 42, at which time the weight of the motor is supported entirely by said abutment. The maximum elevation to which the motor can be lifted by the lever 43, and consequently the pressure with which the pinion 37 may be engaged with the disk 36 and the amount of power which may be transmitted through the friction gearing to the machine, is determined by the adjustment of the screw 44 and, having been once provided for by such adjustment, need not be considered by the operator in his subsequent manipulation of the handle 47.

Having thus described my invention, I claim:

1. The combination of a supporting abutment, a driven member, a movably supported motor having a driving member, a lever having a pivotal connection with said motor for supporting and lifting the same to engage said members, and a fulcrum for said lever located between said pivotal connection and the operating end of said lever and movably engaging said abutment upon shifting the lever.

2. The combination with a driven member, of a motor having a driving member, said motor being movably supported to permit said driving member to engage and disengage said driven member, and means for moving said motor comprising a lever having a pivotal connection therewith, a fixed abutment, and a fulcrum member adjustably carried by said lever and movable over said abutment as said lever is swung upon its pivotal connection with said motor.

3. The combination with a driven gear, of a motor having a cooperating driving gear, a pivoted base by which said motor is supported, said base being vertically movable, on its pivot, to raise and lower said motor and thereby engage and disengage said gears, a lever pivoted to said base, a fixed abutment, and an abutment screw adjustably carried by said lever and movable over said fixed abutment into and out of vertical alinement with the pivot connecting said lever and base as said lever is swung about the latter pivot to raise and lower said motor respectively.

4. The combination of a driven rotary member, a driving member therefor, a pivoted frame for supporting said last member, a swinging lever extending beneath said frame and supporting the same at one point on the lever and adapted to be swung to engage said members, a downwardly extending fulcrum carried by said lever between said point of support and the operating end of the lever, said fulcrum upon swinging the lever to raise said frame being movable into predetermined position beneath said point of support to lock the lever in position.

In testimony whereof I affix my signature.

JASPER DERRY.